United States Patent [19]

Lazarevic

[11] Patent Number: 4,915,553

[45] Date of Patent: Apr. 10, 1990

[54] TOOL RETENTION AND EJECTION MECHANISM

[75] Inventor: Milisav Lazarevic, Racine, Wis.

[73] Assignee: Tree Machine Tool, Co., Racine, Wis.

[21] Appl. No.: 304,448

[22] Filed: Feb. 1, 1989

[51] Int. Cl.⁴ .............................................. B23Q 3/12
[52] U.S. Cl. ...................................... 409/233; 408/56
[58] Field of Search ................... 408/56; 409/231, 233

[56] References Cited

U.S. PATENT DOCUMENTS

| 4,347,753 | 9/1982 | Claussen et al. | 409/233 |
| 4,632,613 | 12/1986 | Wollermann | 409/233 |

FOREIGN PATENT DOCUMENTS

| 53136 | 3/1984 | Japan | 409/233 |
| 199308 | 9/1987 | Japan | 409/233 |
| 528152 | 10/1976 | U.S.S.R. | 409/233 |
| 891259 | 12/1981 | U.S.S.R. | 409/231 |

*Primary Examiner*—Daniel Howell
*Attorney, Agent, or Firm*—Quarles & Brady

[57] ABSTRACT

The operating mechanism of a tool retention and ejection mechanism for the spindle of a machine tool is located in an annular space between the spindle and the quill. A drawbar is slidably disposed in an axial bore formed in the spindle and is provided with a collet at the cutter end of the spindle for engaging a tool holder and drawing it into the socket of the spindle. The drawbar is shifted into its locking position by an annular array of balls that are forced against a bevel surface by a cam ring that is moved to a locking position by a spring. The bevel surface is formed on a ring that encircles the spindle and which is coupled to the drawbar by a crossbar that extends radially through the spindle. In order to increase the power available for releasing the mechanism, two annular pistons are provided in an annular cylinder disposed in the space between the spindle and the quill. These pistons are actuated to overcome the force of the spring and first shift the cam ring for admitting the balls to move away from the bevel surface for releasing the drawbar and then shift the drawbar to its unlocking position for releasing the tool holder. As the tool holder is being released, a flow of air travels through passages formed in the spindle into the spindle socket for cleaning chips and debris from the tool holder and the spindle socket.

7 Claims, 2 Drawing Sheets

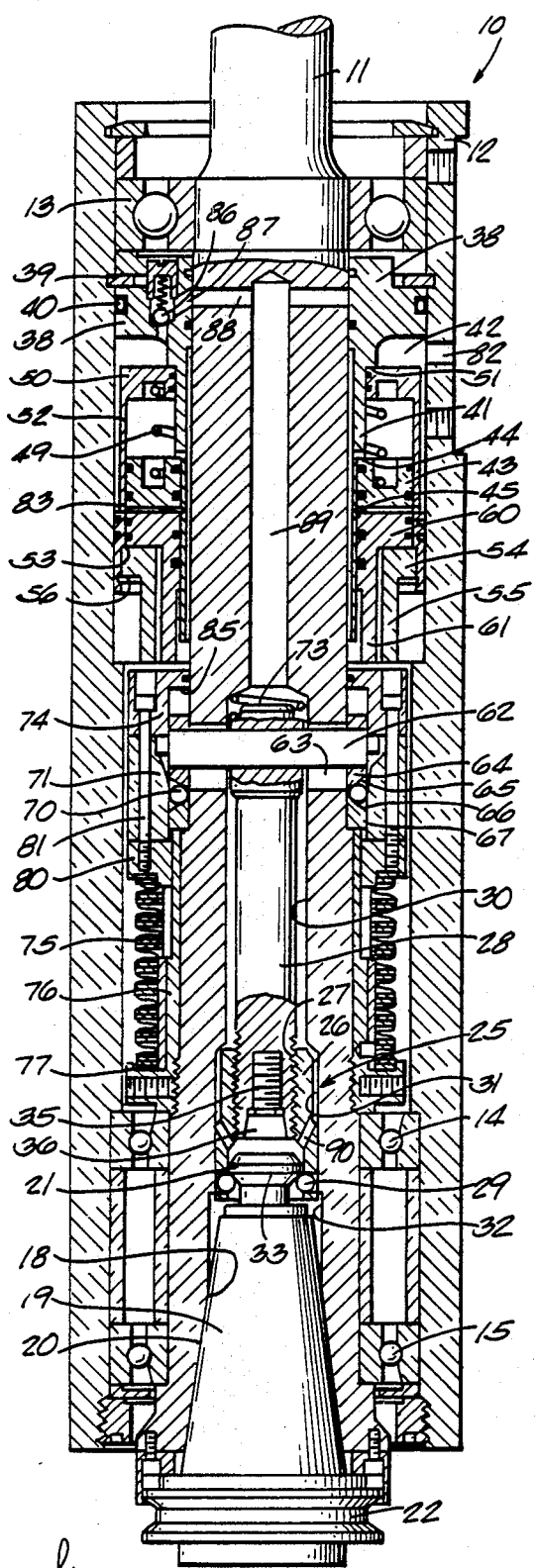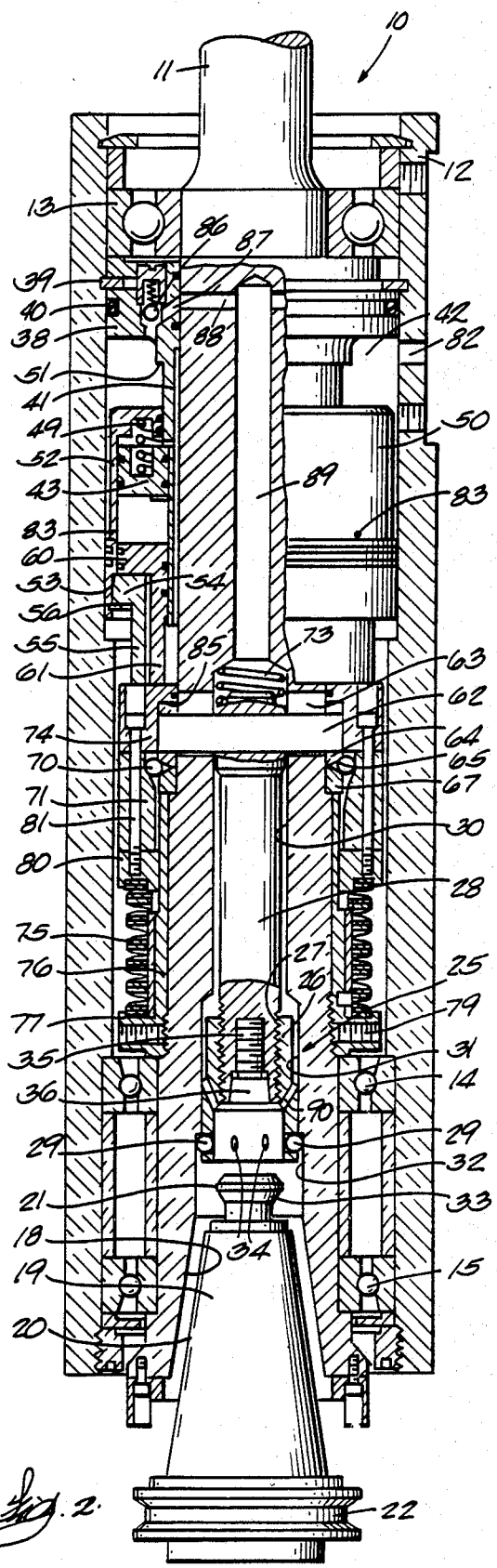

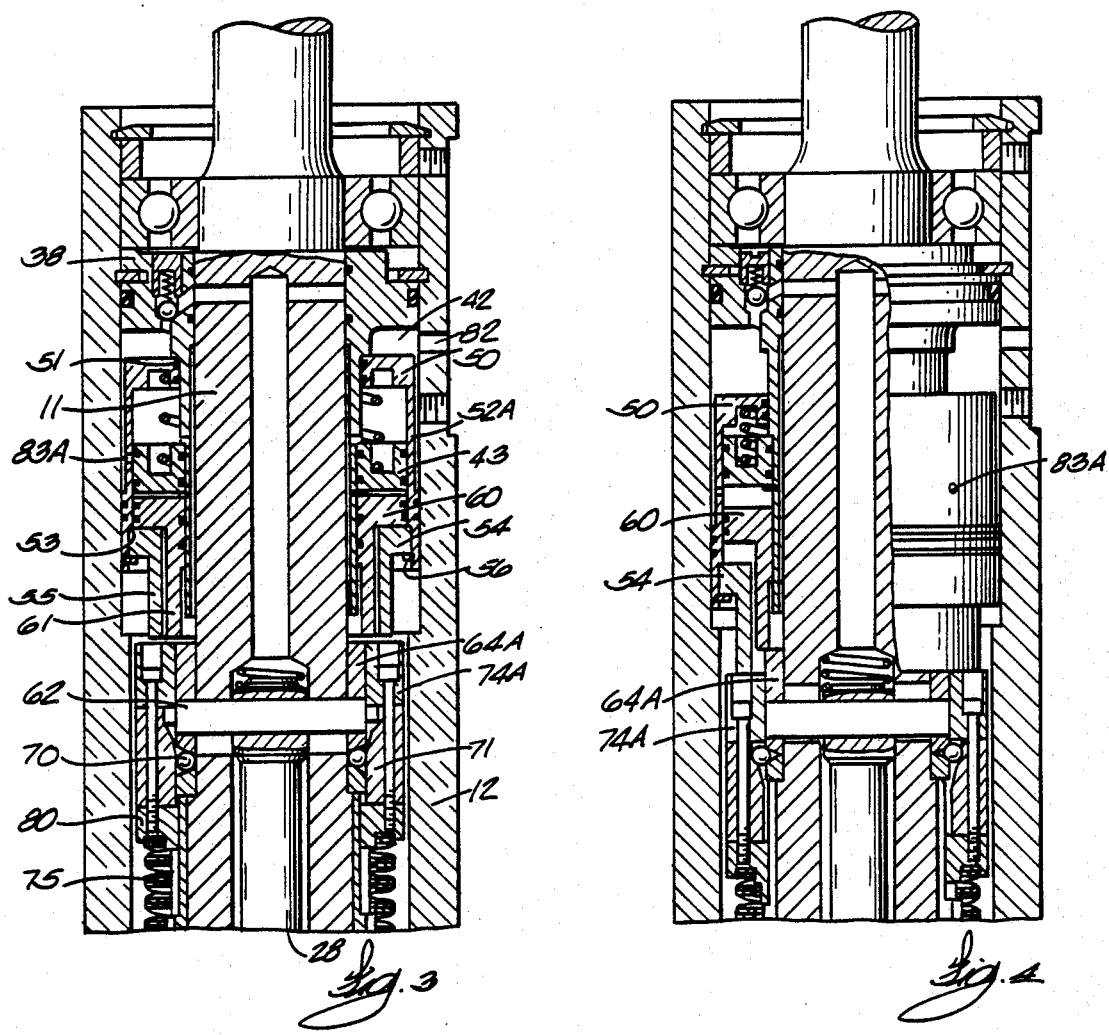
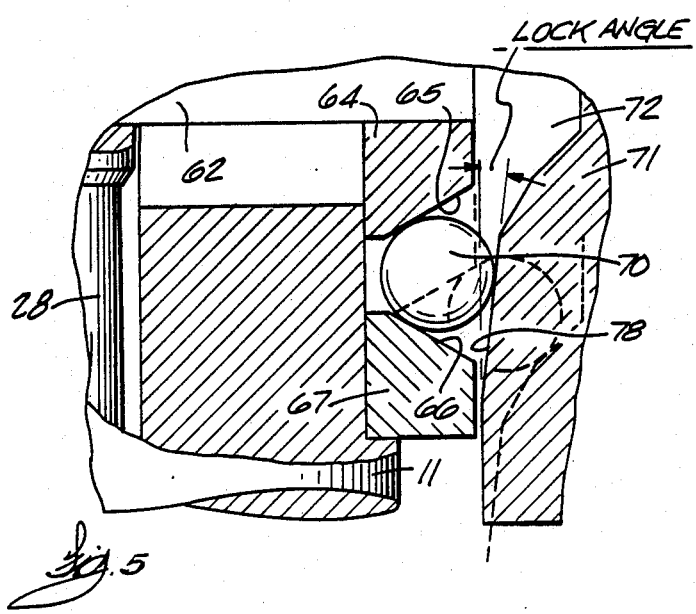

TOOL RETENTION AND EJECTION MECHANISM

BACKGROUND OF THE INVENTION

The present invention pertains to the mechanism for retaining a tool holder in the socket of a machine tool spindle, ejecting it therefrom for removal from the machine and cleaning chips and debris from the socket and tool holder during the tool change cycle.

With the advent of automatic tool changers for changing the tools in the socket of a machine tool spindle, the need arose for an automatic power operated mechanism to retain the tool in the socket of the spindle and to eject the tool when it is desired to remove the tool from the machine. A variety of mechanisms have been devised to meet this need. Most of them require the boring of a hole through the entire length of the spindle along its axis for the reception of a drawbar that actuates the collet mechanism for securing the tool. With this arrangement the source of power for actuating the drawbar is mounted at the back end of the spindle. Such mechanism increases the length of the space required for the spindle. Moreover, the bore extending through the length of the spindle reduces its strength so that a larger diameter spindle is required.

An example of the prior art tool retention mechanisms is illustrated in U.S. Pat. No. 4,347,753 where the actuating mechanism is shown mounted on the rear end of the spindle to add a substantial length to the spindle. Moreover, the actuating mechanism actuates a control bar that extends through the entire length of the spindle requiring a relatively large axial bore in the spindle.

Such disadvantages in power operated drawbars for a tool retention and ejection mechanism were overcome by the structure depicted in U.S. Pat. No. 4,632,613 where the power for operating the drawbar is obtained from an annular piston and cylinder mechanism disposed in an annular space between the spindle and the quill that supports the spindle. This eliminates the power source mounted on the end of the spindle and does not require the axial bore through the entire length of the spindle. However, the mechanism employs a plurality of pins extending radially in the spindle and movable axially to engage the retention knob of a conventional tool holder for retaining the tool holder in the spindle socket and for ejecting it therefrom. This design has been found to be lacking in reliability because of the failure of the pins due to rapid wear and distortion. The mechanism is also very sensitive to inaccuracies in construction and the radial holes that are required in the spindle to accommodate the pins detract from the strength of the spindle. Moreover, the radial holes are required in the area of the spindle bearings so that the two bearings cannot be spaced from each other to increase the rigidity of the spindle.

SUMMARY OF THE INVENTION

The present invention provides a drive mechanism located in an annular space between the spindle and the quill as does the structure disclosed in U.S. Pat. No. 4,632,613. However, instead of utilizing only one piston for generating the power, two pistons operating together are provided to double the amount of power available for overcoming the force of the spring that retains the mechanism in the locked condition for securing the tool holder in the socket of the spindle. As a result, a much stronger spring can be used to increase the force used for retaining the tool holder in the socket of the spindle.

Furthermore, instead of using pins to secure the tool holder, the present invention provides a plurality of balls in annular array in the collet for engaging the retention knob of the tool holder and firmly retain the tool holder in the spindle socket. Another annular array of balls encircles the spindle in position to be actuated by a cam ring that is operated by the spring for shifting the drawbar to its locking position for actuating the collet to move the collet balls in tight engagement with the retention knob of the tool holder to secure the tool holder in the socket of the spindle. These balls can be easily manufactured with great accuracy and are capable of transmitting a heavy force without becoming worn or distorted.

The cam ring is provided with a cylindrical cam that engages the array of balls to force them into position for shifting the drawbar to the locking position. As previously mentioned, a stronger spring can be used because of the additional power that is available for overcoming the pressure of the spring provided by the double piston arrangement. However, a locking angle is provided on the cylindrical cam for holding the balls in locking position and the cam amplifies the force applied by the spring so that the balls and therefore the drawbar as well as the collet are retained in locking position with a very great force so that the tool holder is securely locked in the socket of the spindle.

The two pistons in the drive mechanism can be conveniently actuated by compressed air. This feature is taken advantage of in the present invention by providing a passage in the spindle for a flow of air into the spindle socket for blowing chips and debris off of the tool holder and the surface of the socket. A normally closed check valve is provided in the cylinder that contains the piston. After the pistons have been driven to their limits of movement by the admittance of compressed air into the cylinder, the pressure in the cylinder increases by an amount sufficient to open the check valve. This admits a flow of compressed air into the spindle passage which flows into the spindle socket for blowing the chips and debris off of the tool holder and the surface of the socket.

The foregoing and other objects of this invention, which will become more fully apparent from the following detailed description may be achieved by means of the exemplifying apparatus depicted in and set forth in this specification in connection with the accompanying drawings.

FIG. 1 is a cross-sectional view taken through the center of a machine tool spindle assembly incorporating the features of the present invention and depicting the assembly in a tool retention condition;

FIG. 2 is a cross-sectional view taken through the center of the machine tool spindle assembly shown in FIG. 1 but depicting the assembly in a tool release condition;

FIG. 3 is a cross-sectional view taken through the center of an alternate embodiment of the machine tool spindle assembly illustrated in FIG. 1 and showing the assembly in a tool retention condition;

FIG. 4 is a cross-sectional view taken through the center of the machine tool assembly illustrated in FIG. 3 but depicting the assembly in a tool release condition;

FIG. 5 is an enlarged detail view in vertical cross-section illustrating the contour of the cam ring and its relationship to the annular array of balls that actuate the drawbar to its tool retention position.

Reference is now made more particularly to the drawings and specifically to FIGS. 1 and 2 thereof which illustrate a spindle assembly generally identified by the reference numeral 10. The spindle assembly 10 is especially adapted for use with an automatic tool changer for changing the tools in the spindle. The assembly includes a spindle 11 rotatably supported in a quill 12 by bearings 13, 14 and 15. The quill 12 is slidably supported in a spindle head (not shown) to produce the axial movement of the spindle assembly 10.

The spindle 11 is provided with a tapered socket or opening 18 for receiving a tool holder 19 which presents a tapered shank 20 that is complementary to the tapered opening 18 of the spindle 11. The tool holder 19 is inserted into the socket 18 of the spindle so that its tapered shank 20 is in tight engagement with the tapered surface of the socket to establish a driving engagement between the rotary spindle 11 and the tool holder 19. The tool holder 19 is of conventional construction that has been adopted by the American National Standard Institute as the standard tool holder for use in automatic machine tools as specified in ANSI Standard B5 TC45.

The tool holder includes a retention knob 21 extending axially from the narrow end of the shank 20. The retention knob 21 is provided for engagement by a mechanism to be later described for retaining the tool holder 19 in the spindle 11. The large diameter end of the tool holder 19 includes an annular groove 22 for engagement by the tool grip of a tool change arm (not shown) for securing the tool 19 to the tool change arm while the tool is being transferred.

The collet mechanism for engaging the tool retention knob 21 of the tool holder 19 is generally identified by the reference numeral 25. It comprises a sleeve 26 having an internal thread 27 that is in threaded engagement with a complementary thread on a drawbar 28 for securing the collet to the end of the drawbar. The sleeve 26 is threaded onto the drawbar to adjust the length of the system for most efficient operation. It is then locked in position by a screw 35 having a tapered head 36 that is in engagement with a split end of the drawbar that presents a complementary tapered opening for receiving the tapered head 36. The screw 35 is tightened to cause its tapered end to expand the opening in the drawbar to lock it tightly against the sleeve 26. The extending end of the sleeve 26 is provided with a plurality of radial holes 34 for receiving balls 29.

The drawbar 28 is disposed axially within a bore 30 formed in the spindle 11, the drawbar 28 being movable axially within the bore. The bore 30 is enlarged to provide an increased diameter portion 31 for slidably receiving the collet 25. A further enlarged diameter portion 32 is formed at the extremity of the bore which opens into the socket 18 of the spindle 11.

The balls 29 are movable radially within the holes 34 formed in the end of the sleeve 26 and engage a surface 33 shaped as a frustum formed on the retention knob 21. The view in FIG. 1 illustrates the balls 29 in engagement with the surface 33 of the retention knob 21 for retaining the tool holder 19 within the socket of the spindle. With the balls 2 in this position, the tool holder 19 is securely retained within the socket of the spindle. In order to release the retention knob 21 and its associated tool holder 19, the drawbar 28 is moved towards the spindle socket 18 to move the collet 25 with it to the position shown in FIG. 2. With the collet in this position, the balls 29 are disposed within the enlarged diameter 32 where they have sufficient space to move outwardly of their retaining holes 34 to permit the passage of the retention knob 21 between them.

The drive mechanism for actuating the drawbar 28 in its axial movement is disposed in the annular space between the spindle 11 and the quill 12. An annular wall 38 is fixed to the quill 12 by a snap ring 39 and is rendered air tight with respect to the quill by means of an 0-ring 40. A sleeve 41 extends from the wall 38 and is disposed about the periphery of the spindle 11. The outer surface of the sleeve 41 cooperates with the inner surface of the quill 12 to form an annular cylinder 42. Another annular wall 43 is fixed within the cylinder 42 in spaced relationship to the wall 38. The upper surface of the wall 43 abuts a shoulder 44 formed in the sleeve 41 and is held against the shoulder 44 by a snap ring 45 bearing against its opposite face.

An annular piston 50 is disposed within the cylinder 42 for movement between the two annular walls 38 and 43. The piston 50 is normally urged into engagement with an annular shoulder 51 formed in the sleeve 41 by a spring 49. One end of the spring 49 bears against a face of the annular wall 43 while the opposite end of the spring 49 bears against a face of the piston 50 to retain its opposite face in engagement with the shoulder 51.

The piston 50 includes an extending annular sleeve 52 disposed to encircle the inner wall of the quill 12, the sleeve 52 being formed to provide a shoulder 53 which receives a flange 54 of an actuator ring 55. The flange 54 is retained in engagement with the shoulder 53 by means of a snap ring 56 that has its outer diameter in engagement with a groove formed in the sleeve 52. As a result, the actuator ring 55 is coupled to move with the piston 50.

The piston 50 is disposed on one side of the annular wall 43 while a second piston 60 functions on the opposite side of the annular wall 43. The piston 60 is provided with an extending sleeve 61 that extends along the outer diameter of the sleeve 41.

A crossbar 62 extends transversely through the interior end of the drawbar 28 for movement therewith. The crossbar 62 can move laterally relative to the spindle 11 within a slot 63 formed transversely through the spindle. The crossbar 62 extends beyond the diameter of the spindle into suitable bores formed in a locking ring 64 which is movable axially relative to the spindle 11. On edge of the locking ring 64 is provided with a beveled surface 65 that extends about the periphery of the ring 64 for cooperation with an opposing beveled surface 66 formed on a fixed ring 67 that is secured to the spindle 11. The bevels 65 and 66 form an annular groove of V-shaped cross section that opens outwardly to receive a plurality of balls 70.

The balls 70 are shifted by a cam ring 71 into the annular groove between the bevels 65 and 66 for shifting the locking ring 64 and thereby moving the crossbar 62 to lock the tool holder 19. FIG. 5 is an enlarged detailed view showing the cam ring 71 disposed in its locking position where it forces the balls 70 into the V-groove between the bevels 65 and 66 for urging the locking ring 64 upwardly to move the crossbar 62 with it for locking the tool holder 19 within the socket 18 of the spindle 11. As shown in FIG. 5, a locking surface 78 on the cam ring 71 which is in engagement with the balls 70 is formed at a locking angle so that any pressure exerted by the balls 70 against the locking surface 78 does not generate a force tending to urge the cam ring 71 toward the unlocking position.

FIG. 1 shows the cam ring 71 in its locking position forcing the balls 70 into the V-grove between the two bevels 65 and 66 for shifting the locking ring 64 toward the rear of the spindle for locking the tool holder 19 in position. To release the tool holder 19 from the collet 25, the cam ring 71 is shifted downwardly from the position shown in FIG. 1 to the position shown in FIG. 2 so that the receding end 72 of the cam ring 71 moves into alignment with the balls 70. Such movement creates a space into which the balls 70 can move to release the locking ring 64 and its associated crossbar 62. As a result, the drawbar 28 is free to move toward the socket 18 of the spindle 11 so that the balls 29 retaining the tool holder 19 in the spindle can move into the space provided for releasing the retention knob 21 so that the tool holder can be removed from the spindle.

The crossbar 62 is continuously urged rearwardly of the spindle to its locking position by a spring 75 that is disposed about a liner 76 that encircles the spindle 11. One end of the spring 75 bears against an abutment ring 77 that is coupled to the spindle 11 by set screws 79. The opposite end of the spring 75 bears against a movable ring 80 which is slidable along the periphery of the liner 76. The movable ring 80 is coupled to the cam ring 71 and the actuator ring 74 by a plurality of bolts 81. The bolts 81 pass through suitable holes formed in the actuator ring 74 and the cam ring 71 and into threaded engagement with a threaded hole in the movable ring 80 to securely connect these three elements together so that they move in unison. The spring 75 normally forces this assembly to its outer position to retain the crossbar 62 and its associated drawbar 28 in their locking position for locking a tool holder 19 in the spindle socket 18.

The mechanism is actuated from the locking position shown in FIG. 1 for releasing the tool holder 19 in the spindle socket 18 by operation of the pistons 50 and 60. To this end, fluid pressure, such as air, is admitted into the cylinder 42 through a port 82. The fluid pressure in the cylinder 42 acts upon the piston 50 and flows into the space between the outer surface of the sleeve 52 and the inner surface of the quill 12 to a second port 83 formed in the sleeve 41. The port 83 is located so that it admits fluid pressure into the space between the annular wall 43 and the top of the piston 60 to exert a pressure upon the piston 60 for forcing it away from the fixed wall 43. With this arrangement, the pistons 50 and 60 work in unison to double the force that would be applied by one piston operating alone. The increased force generated by the operation of the two pistons 50 and 60 permits the use of a stronger spring 75 for holding the mechanism in its closed position as shown in FIG. 1.

The actuator ring 55 is coupled to the piston 50 as previously described so that it moves with the piston and the sleeve 61 moves with the piston 60 from which it extends. Accordingly, since the pistons 50 and 60 move in unison, the actuating ring 55 and sleeve 61 likewise move in unison. The ends of the actuating ring 55 and the sleeve 61 are in alignment so that their movement with the associated pistons acts against the locking ring 64 to move it as well as the cam ring 71 and the movable ring 80 against the pressure of the spring 75 to the release position shown in FIG. 2.

As the cam ring 71 moves toward the release position with the assembly, the receding portion 72 of the cam ring 71 moves into alignment with the balls 70 to provide space for their movement out of the V-groove formed by the bevels 65 and 66 for releasing the crossbar 62 and its associated drawbar 28 to the release position for releasing the tool holder 19. When the cam ring 71 has moved sufficiently to provide the space for the release of the balls 70, a shoulder 85 formed on the actuator ring 74 engages the locking ring 64 to force the latter along with its associated crossbar 62 and the drawbar 28 to the release position shown in FIG. 2.

Once the movable elements have reached their limit of movement, the pressure in the cylinder 42 increases to force a check valve 86 from its closed position shown in FIG. 1 to its open position shown in FIG. 2 and to admit the air pressure through a port 87 into a transverse hole 88 formed in the spindle. The pressure then flows through an axial bore 89 into the space provided about the periphery of the drawbar 28 and about the sleeve 26 through ports 90 opening into the socket 18 of the spindle 11. Thus during the tool change cycle there is a flow of air into the socket 18 which serves to clean the chips and debris from the socket as well as from the tool holder 19 inserted into the socket.

In order to return the mechanism to its locking position for retaining a tool holder 19 within the socket 18 of the spindle, the pressure is withdrawn from the cylinder 42 to release the pistons 50 and 60. This permits the spring 75 to expand to its normal position, moving the movable ring 80 and the cam ring 71 along with the actuator ring 74 as a unit toward the rear of the spindle. As a result, the locking surface 78 of the cam ring 71 moves into engagement with the balls 70 to force them into the groove formed by the bevel surfaces 65 and 66. Such movement of the balls 70 causes the locking ring 64 to shift towards the rear of the spindle to move the crossbar 62 along with its associated drawbar 28 with it for drawing the collet 25 into the bore 31. This causes the balls 29 to shift into engagement with the surface 33 of the retention knob 21 and draws the shank 20 of the tool holder 19 into tight engagement with the socket 18 of the spindle 11.

With the pistons 50 and 60 working together as described for the embodiment shown in FIGS. 1 and 2, the elements must be carefully adjusted to insure that the cam ring 71 releases the balls 70 before any force is applied to the locking ring 64 for moving the drawbar 28 to the release position. This adjustment is not as critical in the embodiment illustrated in FIGS. 3 and 4 where the pistons 50 and 60 work sequentially rather than in unison. The construction of the mechanism in FIGS. 3 and 4 is the same as shown in FIGS. 1 and 2 except that the pistons 50 and 60 operate sequentially. In this description the elements are assigned the same reference numerals as the corresponding parts in FIGS. 1 and 2 except that those parts which are modified have the letter "A" added as a suffix to the reference numeral.

The piston 50 is provided with an extending sleeve 52A to which the actuator ring 55 is attached by means of the snap ring 56 retaining the actuator ring 55 in engagement with the shoulder 53 formed in the sleeve 52A. The sleeve 52A differs from the sleeve 52 shown in FIGS. 1 and 2 in that the port 83A is not in alignment with the top of the piston 60 when the piston 50 is in its idle position in engagement with the shoulder 51. Instead, the port 83A is displaced from the piston 60 so that the latter is not actuated until the piston 50 has moved towards the forward portion of the spindle a sufficient distance to bring the port 83A into alignment with the face of the piston 60. When this occurs, the fluid pressure in the cylinder 42 flowing into the space between the outer diameter of the sleeve 52A and the inner surface of the quill 12 flows through the port 83A into the space between the piston 60 and the annular wall 43 to actuate the piston in its operating movement.

The actuator ring 74A has also been modified over the actuator ring 74 shown in FIGS. 1 and 2 by eliminating the shoulder 85 so that it can operate independently of the locking ring 64A. The latter, in turn, differs from the locking ring 64 depicted in FIGS. 1 and 2 only in that its height has been extended so that it can be engaged directly by the end of the extending sleeve 61. Therefore, when the piston 50 is actuated, the actuator ring 55 moves with it independently of the piston 60 to engage the actuator ring 74A and move the latter along with the cam ring 71 and the movable ring 80 to compress the spring 75 and release the balls 70 into the receding end of the cam ring 71 as shown in FIG. 4. After the balls have thus been released, the port 83A moves into alignment with the space between the annular wall 43 and the piston 60 to actuate the piston 60 in its releasing movement. Its extending sleeve 61 moves with it to engage the locking ring 64A and force the ring and its associated crossbar 62 along with the drawbar 28 to the release position as shown in FIG. 4. All other portions of the embodiment illustrated in FIGS. 3 and 4 operate in the same manner as previously described for the embodiment shown in FIGS. 1 and 2.

From the foregoing detailed description of the illustrative embodiments set forth herein to exemplify the present invention, it will be apparent that there has been provided an improved tool retention and ejection mechanism adapted for use in the spindle of a machine tool. The mechanism is located in an annular space between the spindle and its supporting quill and provides an improved construction for securely retaining a tool holder in the socket of a spindle and operates to positively eject the tool holder when the mechanism is released. Moreover, the improved retention and ejection mechanism of the present invention includes an arrangement for providing a flow of air into the socket of the spindle when the tool holder is being released for cleaning debris and chips from the tool holder as well as from the socket. This process continues during the tool change cycle.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention as defined in the subjoined clams.

I claim:

1. A tool retention and ejection mechanism for a spindle having an axial socket for receiving a tool that is provided with a rearwardly extending retention knob comprising:
   a collet actuatable to engage the retention knob and draw the tool into the socket of the spindle and retain it therein;
   a drawbar coupled to said collet and being movable relative to the spindle between a locking position and a release position for actuating the collet;
   biasing means connected to move said drawbar into its locking position for actuating said collet to draw the tool into the socket of the spindle and retain it therein;
   a first annular piston and cylinder mechanism encircling the spindle and connected to actuate said biasing means;
   a second piston and cylinder mechanism encircling the spindle and connected to actuate said drawbar;
   a source of fluid pressure;
   a first port in said first cylinder;
   a second port in said second cylinder;
   means connecting said first port to said source of fluid pressure and then subsequently connecting said second port to said source of fluid pressure whereby said piston and cylinder mechanisms operate sequentially so that said first piston and cylinder mechanism is actuated to relieve the pressure of said biasing means for releasing said drawbar and said second piston and cylinder mechanism is then actuated to shift said drawbar out of its locking positions for moving said collet to release the retention knob of the tool so that the latter can be removed from the spindle.

2. A tool retention and ejection mechanism according to claim 1 wherein said piston and cylinder mechanisms are actuated by pneumatic pressure and including a normally closed check valve in one of said cylinders, said valve being adapted to open when subjected to the increased pressure developed in the cylinders when their associated pistons have reached their limits of movement; and
   a passage coupled to receive the pneumatic pressure from said valve and direct it into said socket for blowing the chips and debris out of said socket and from the tool being removed therefrom.

3. A tool retention and ejection mechanism for a spindle having an axial socket for receiving a tool that is provided with a rearwardly extending retention knob comprising;
   a collet actuatable to engage the retention knob and draw the tool into the socket of the spindle and retain it therein;
   a drawbar slidably disposed in an axial bore formed in said spindle, said drawbar being movable between a locking position and a release position;
   an annular cylinder encircling the spindle;
   an annular piston in said cylinder;
   a source of fluid pressure;
   a port in said cylinder;
   a passage in communication with said source of fluid pressure and said port for admitting the fluid pressure through said port into said cylinder to actuate said piston;
   a locking ring encircling the spindle and movable axially relative to the spindle;
   a crossbar coupled to move with said drawbar and with said locking ring, said crossbar extending through a transverse slot in said spindle so that it is movable laterally relative to said spindle;
   a beveled annular edge on said locking ring;
   a fixed ring secured to said spindle;
   a beveled annular edge formed on said fixed ring and facing the beveled edge on said locking ring to form therewith an annular groove;
   a plurality of balls disposed in said annular groove;
   a cam ring encircling the spindle and slidable axially relative thereto;
   a locking surface formed on said cam ring for movement into engagement with said balls to force them into said annular groove to spread said beveled edges apart by shifting said locking ring and thereby moving said drawbar to its locking position for securing the tool in said collet;

a receding surface on said cam ring movable by said piston into alignment with said balls to furnish a space for the balls to move outwardly of said groove so that said locking ring can move its beveled edge toward the beveled edge on said fixed ring to move said drawbar and its associated collet to their release position for releasing the tool in said collet;

a spring connected to bias said cam ring so that its locking surface is in engagement with said balls for moving said drawbar to its locking position for securing the tool in said collet; and means for admitting the fluid pressure into said cylinder for actuating said piston to shift said cam ring against the pressure of said spring so that its receding surface is in alignment with said balls for releasing said drawbar and its associated collet.

4. A tool retention and ejection mechanism for a spindle having an axial socket for receiving a tool that is provided with a rearwardly extending retention knob comprising;

a collet actuatable to engage the retention knob and draw the tool into the socket of the spindle and retain it therein;

a drawbar coupled to said collet and being movable relative to the spindle between a locking position and a release position for actuating the collet;

biasing means connected to move said drawbar into its locking position for actuating said collet to draw the tool into the socket of the spindle and retain it therein;

a cylinder;

a piston in said cylinder for engaging with said drawbar;

a source of pneumatic pressure;

a port in said cylinder;

a passage in communication with said source of pneumatic pressure and said port for admitting the pneumatic pressure into said cylinder to relieve the force of said biasing means and shift said drawbar to move said collet for releasing the tool and ejecting it from the spindle socket;

a normally closed check valve in said cylinder, said valve being adapted to open when subjected to the increased pressure developed in said cylinder when said piston has reached its limit of movement; and a passage coupled to receive the pneumatic pressure from said valve and direct it into said socket for blowing the chips and debris out of said socket and from the tool being removed therefrom.

5. A tool retention and ejection mechanism according to claim 4 wherein said cylinder is of annular configuration encircling the spindle and said piston is of annular configuration.

6. A tool retention and ejection mechanism according to claim 5, including a second annular piston and cylinder mechanism operating simultaneously with said first annular piston and cylinder mechanism for relieving the force of said biasing means and shifting said drawbar to move said collet for releasing the tool and ejecting it from the spindle socket.

7. A tool retention and ejection mechanism for a spindle having an axial socket for receiving a tool;

a collet actuatable to engage the tool and draw it into the socket of the spindle and retain it therein;

a drawbar coupled to said collet and being movable relative to the spindle between a locking position and a release position for actuating the collet;

biasing means connected to bias said drawbar into its locking position for actuating said collet to draw the tool into the socket of the spindle and retain it therein;

a pair of piston and cylinder mechanisms connected to actuate said biasing means and said drawbar;

a source of pneumatic pressure;

means connecting said source of pneumatic pressure to both of said cylinders simultaneously so that said pair of piston and cylinder mechanisms operate simultaneously;

a normally closed check valve in one of said cylinders, said valve being adapted to open when subjected to the increased pressure developed in the cylinders when their associated pistons have reached their limits of movement;

and a passage coupled to receive the pneumatic pressure from said valve and direct it into said socket for blowing the chips and debris out of said socket and from the tool being removed therefrom.

* * * * *